US011775312B2

(12) United States Patent
Ganguly et al.

(10) Patent No.: US 11,775,312 B2
(45) Date of Patent: Oct. 3, 2023

(54) LOOK-UP TABLE CONTAINING PROCESSOR-IN-MEMORY CLUSTER FOR DATA-INTENSIVE APPLICATIONS

(71) Applicants: Amlan Ganguly, W. Henrietta, NY (US); Sai Manoj Pudukotai Dinakarrao, Falls Church, VA (US); Mark Connolly, Newfane, NY (US); Purab Ranjan Sutradhar, Rochester, NY (US); Sathwika Bavikadi, Fairfax, VA (US); Mark Allen Indovina, Rochester, NY (US)

(72) Inventors: Amlan Ganguly, W. Henrietta, NY (US); Sai Manoj Pudukotai Dinakarrao, Falls Church, VA (US); Mark Connolly, Newfane, NY (US); Purab Ranjan Sutradhar, Rochester, NY (US); Sathwika Bavikadi, Fairfax, VA (US); Mark Allen Indovina, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 17/717,947

(22) Filed: Apr. 11, 2022

(65) Prior Publication Data
US 2022/0326958 A1    Oct. 13, 2022

Related U.S. Application Data

(60) Provisional application No. 63/172,902, filed on Apr. 9, 2021.

(51) Int. Cl.
*G06F 9/38* (2018.01)
*G06F 9/50* (2006.01)
(Continued)

(52) U.S. Cl.
CPC .......... *G06F 9/3887* (2013.01); *G06F 9/3001* (2013.01); *G06F 9/5072* (2013.01); *G06F 12/0851* (2013.01); *G06N 3/063* (2013.01)

(58) Field of Classification Search
None
See application file for complete search history.

(56) References Cited

U.S. PATENT DOCUMENTS 9,697,877 B2    7/2017  Shanbhag et al.
2011/0119467 A1  5/2011  Cadambi et al.
(Continued)

FOREIGN PATENT DOCUMENTS

EP    3259674 A1    12/2017

OTHER PUBLICATIONS

Kaya, O. et. al., Scalable Sparse Tensor Decompositions in Distributed Memory Systems, 2015, ACM, 11 pages. (Year: 2015).*
(Continued)

*Primary Examiner* — Eric Coleman
(74) *Attorney, Agent, or Firm* — Joseph M. Noto; Bond, Schoeneck & King PLLC

(57) ABSTRACT

A processing element includes a PIM cluster configured to read data from and write data to an adjacent DRAM subarray, wherein the PIM cluster has a plurality of processing cores, each processing core of the plurality of processing cores containing a look-up table, and a router connected to each processing core, wherein the router is configured to communicate data among each processing core; and a controller unit configured to communicate with the router, wherein the controller unit contains an executable program of operational decomposition algorithms. The look-up tables can be programmable. A DRAM chip including a plurality of DRAM banks, each DRAM bank having a plurality of interleaved DRAM subarrays and a plurality of the PIM
(Continued)

clusters configured to read data from and write data to an adjacent DRAM subarray is disclosed.

10 Claims, 14 Drawing Sheets
(13 of 14 Drawing Sheet(s) Filed in Color)

(51) Int. Cl.
   *G06F 12/0846* (2016.01)
   *G06N 3/063* (2023.01)
   *G06F 9/30* (2018.01)

(56) References Cited

U.S. PATENT DOCUMENTS

2015/0131383 A1   5/2015   Akerib et al.
2019/0296892 A1*  9/2019   Murphy .................. G11C 7/08
2019/0379380 A1* 12/2019   Atsatt .................... H01L 25/18

OTHER PUBLICATIONS

Charles, S et. al., Exploration of Memory and Cluster Modes in Directory-Based Core CMPs, 2018, IEEE, 8 pages. (Year: 2018).*
Kulkarni, A., et. al., Real-Time Anomaly Detection Framework for Many-Core Router through Machine-Learning Techniques, 2016, ACM. pp. 10:1 to 10:22. (Year: 2016).*
Azarkhish, E. et. al., Neurostream: Scalable and Energy Efficient Deep Learning with Smart Memory Cubes. 2017. IEEE. pp. 420-434. (Year: 2017).*
Venkateswaran, N. et. al., Memory In Processor: A Novel Design Paradigm for Supercomputing Architectures. 2004. ACM. pp. 19-26. (Year: 2004).*
Kim, Young-Tae. Performance Comparison of Two Parallel LU Decomposition Algorithms on MasPar Machines. 1998, pp. 247-254. (Year: 1998).*
Li et al., "DRISA: A DRAM-based Reconfigurable In-Situ Accelerator," 2017 50th Annual IEEE/ACM International Symposium on Microarchitecture (MICRO), Boston, MA, 288-301 (2017).
Deng et al., "LAcc: Exploiting Lookup Table-based Fast and Accurate Vector Multiplication in DRAM-based CNN Accelerator," 56th ACM/IEEE Design Automation Conference (2019).
Deng et al., "DrAcc: a DRAM based Accelerator for Accurate CNN Inference," 55th ACM/ESDA/IEEE Design Automation Conference (DAC), San Francisco, CA 1-6 (2018).
Seshadri et al., "Ambit: In-Memory Accelerator for Bulk Bitwise Operations Using Commodity DRAM Technology," 50th Annual IEEE/ACM International Symposium on Microarchitecture (MICRO), Boston, MA 273-287. (2017).
Gao et al., "ComputeDRAM: In-Memory Compute Using Off-the-Shelf DRAMs," In-Proceedings of the 52nd Annual IEEE/ACM International Symposium on Microarchitecture (MICRO '52), Association for Computing Machinery, New York, NY 100-113 (2019).
Li et al., "SCOPE: A Stochastic Computing Engine for DRAM-Based In-Situ Accelerator," 51st Annual IEEE/ACM International Symposium on Microarchitecture (MICRO), Fukuoka, 696-709 (2018) [Need Article].
Xin et al., "ROC: DRAM-based Processing with Reduced Operation Cycles," 56th ACM/IEEE Design Automation Conference (DAC), Las Vegas, NV, 1-6 (2019).
Angizi et al., "ReDRAM: A Reconfigurable Processing-in-DRAM Platform for Accelerating Bulk Bit-Wise Operations," IEEE/ACM International Conference on Computer-Aided Design (ICCAD), Westminster, CO, 1-8 (2019).
Jeon et al., "HMC-MAC: Processing-in Memory Architecture for Multiply-Accumulate Operations with Hybrid Memory Cube," in IEEE Computer Architecture Letters, 17(1):5-8 (2018).
Ali et al., "In-Memory Low-Cost Bit-Serial Addition Using Commodity DRAM Technology," in IEEE Transactions on Circuits and Systems I: Regular Papers, 67(1):155-165 (2020).

* cited by examiner

LOOK-UP TABLE CONTAINING PROCESSOR-IN-MEMORY CLUSTER FOR DATA-INTENSIVE APPLICATIONS

CROSS-REFERENCE

This application claims the benefit of the filing date of U.S. Provisional Patent Application No. 63/172,902, filed Apr. 9, 2021, which is hereby incorporated by reference in its entirety.

This invention was made with Government support under Grant Number CNS-1553264 awarded by the United States National Science Foundation. The United States Government has certain rights in the invention.

FIELD

The present invention relates to a look-up table containing processor-in-memory cluster and a dynamic random access memory chip containing multiple look-up table containing processor-in-memory clusters.

BACKGROUND

State-of-the-art processing hardware such as a Central Processing Unit (CPU) and Graphics Processing Unit (GPU) are based on the von Neumann computing model in which the data operands for computation are stored in a separate memory chip and are fetched sequentially through a narrow bandwidth communication channel (bus) into the processing chip. This results in high latency and inefficient data communication which is creating a performance bottleneck. This also puts a limit on the level of parallelization of operation that can be achieved from a computing device. Modern von Neumann devices utilize high-speed memory, caching, and pipelining technologies to mask the latency and increase parallelism.

However, these devices are still lacking in performance when it comes to recent data-intensive applications such as Machine Learning, Deep Learning, Data-security, Multimedia Processing, etc. A solution to this caveat is to rethink beyond the von Neumann computing model and explore data-centric non-von Neumann models, such as Processor-In-Memory (PIM). PIM devices integrate parallel processing elements inside the memory chip itself which minimizes the data communication latency and power dissipation as well as achieves maximum parallelization of operations. The art lacks ultra-efficient and very high-performance hardware support for data-centric applications such as Convolutional Neural Network and Data Encryption.

Several different PIM approaches have been proposed in the past. One such approach uses a bulk bit-wise computing model where logic operations are performed on the bitlines. However, such architectures are not suitable for operations on larger operands and are severely limited in functionality. Another approach is analog crossbar array computing which is mostly Static Random Access Memory (SRAM) and Resistive Random Access Memory (ReRAM) based and limited to multiplication and accumulation operations. This approach also heavily relies on digital-to-analog-to-digital conversions which make them expensive. A recent Dynamic Random Access Memory (DRAM) based work investigated large Look-Up Tables (LUTs) based on subarray memory cells for performing large-scale multiplications. However, these large LUTs were too memory intensive and the functionality of these large LUTs was limited to multiplication only.

SUMMARY

In accordance with one aspect of the present invention, there is provided processor-in-memory, including: a PIM cluster configured to read data from and write data to an adjacent DRAM subarray, wherein the PIM cluster has a plurality of processing cores, each processing core of the plurality of processing cores containing a look-up table (LUT), and a router connected to each processing core, wherein the router is configured to communicate data among each processing core, and a controller unit configured to communicate with the router, wherein the controller unit contains an executable program of operational decomposition algorithms. The look-up tables can be programmable.

In accordance with another aspect of the present disclosure, there is provided a DRAM chip including a plurality of DRAM banks, each DRAM bank having a plurality of interleaved DRAM subarrays and a plurality of PIM clusters configured to read data from and write data to an adjacent DRAM subarray, wherein the PIM clusters have a plurality of processing cores, each processing core of the plurality of processing cores containing a look-up table, and a router connected to each processing core, wherein the router is configured to communicate data among each processing core; and controller unit configured to communicate with the routers of the PIM clusters, wherein the controller unit contains an executable program of operational decomposition algorithms. The look-up tables can be programmable.

These and other aspects of the present disclosure will become apparent upon a review of the following detailed description and the claims appended thereto.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1B:
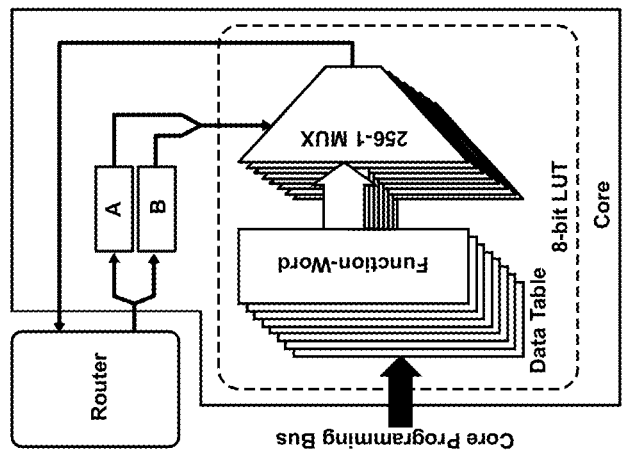
FIG. 1A is a schematic of a PIM cluster architecture and FIG. 1B is a schematic of a PIM core in accordance with an embodiment of the present invention.

A look-up table (LUT)-based processing-in-memory architecture using DRAM technology which can be applied to perform massively parallel computations is described. The LUT within a PIM can be programmed (pPIM). FIG. 1B shows an 8-bit LUT and a core programming bus which carries the function-words to the cores for performing reprogramming of the cores.

Figure 1A:
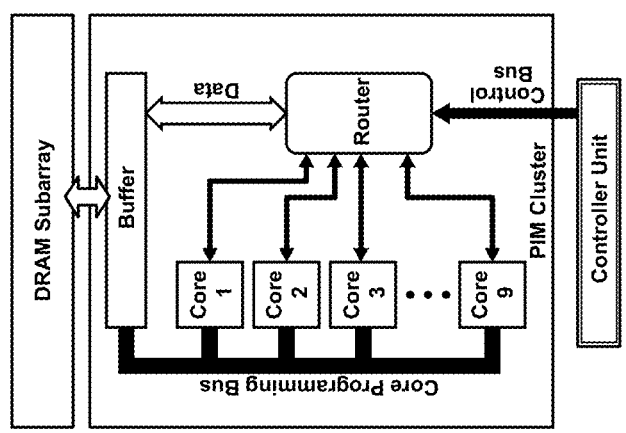

In an embodiment a processor-in-memory includes a PIM cluster configured to read data from and write data to an adjacent DRAM subarray. FIG. 1A shows an embodiment of a PIM architecture containing a PIM cluster, which can be placed in plurality within each DRAM bank, and a controller unit. The PIM cluster has a plurality of processing cores, each processing core has a LUT as shown in a core of FIG. 1B. The PIM cluster contains a buffer as shown in FIG. 1A.

In an embodiment each processing core contains an 8-bit LUT and a pair of input Register A and B. The LUT is implemented with an 8×256-bit data-table and an 8-bit 256:1 multiplexer (MUX). The data-table is constructed from 8 256-bit D-latch arrays. The data-table contains the pre-calculated outputs of an 8-bit operation in the form of 8 individual 256-bit sized function-words. By writing a set of 8 new function-words in the table, the processing core can be reprogrammed to perform a different operation. The input registers A and B control the 'select pins' of the MUX to choose a specific 8-bit entry in the data-table and forward it as the output of the processing core. The output can be a) fed back to the input registers A and B via feedback paths or b) sent outside the processing core to a different core in the same PIM cluster or a different PIM cluster.

By constructing processing cores using LUTs, this invention avoids the adoption of the conventional CMOS logic-based computing approach. This has twofold advantages. First, the DRAM chips have a simpler construction with only a few (i.e., four) metal layers which is not ideal for the integration of complex CMOS logic circuits. On the other hand, the LUTs have a relatively simpler circuit-level construction and therefore, are more suitable for the DRAM chip. Second, since LUTs contain pre-computed results of complex logic/arithmetic operations, the dynamic power consumption during operations is relatively lower than CMOS logic-based computing. This results in relatively higher energy efficiency from computations.

Each processing core is capable of performing 8-bit arithmetic operations including a) multiplication, addition, subtraction, comparisons, and bitwise logic operations on a pair of 4-bit operands, and b) left/right shifting, inversion, substitution, increment, decrement on a single 8-bit operand.

The multiplexer and the latch arrays of the processing core are designed using transmission gate (TG) technology in order to minimize area overhead. Inverters are inserted strategically inside the multiplexer to avoid meta-stability issues as well as to retain output signal quality.

Computing utilizing relatively large (i.e., larger than 8-bit) LUTs tends to increase the area overhead significantly. However, by constructing processing cores using 8-bit LUTs, the area overhead and the power consumption of the device can be minimized. Therefore, each processing core contains one 8-bit LUT which can operate on a pair of 4-bit precision input data. However, in order to support large-precision operations (i.e., inputs larger than 4 bits), in the processing cores, operation-decomposition techniques are required to be adopted. For example, 8-bit, 12-bit, 16-bit, and 32-bit operations can be supported using corresponding decomposition algorithms.

In order to implement various operation decomposition algorithms, multiple processing cores work cooperatively and in parallel. To facilitate the targeted set of operations, each PIM cluster is formed by grouping together and interconnecting, for example, nine identical processing cores. Large precision operands (i.e., 8-bit, 12-bit, or higher) are decomposed into smaller (i.e., 4-bit) segments and these smaller-precision operations are distributed to one or more of the processing cores in a PIM cluster. This is followed by the execution of various logic/arithmetic operations in multiple stages in the processing cores according to the decomposition algorithm. Examples of such decomposition algorithms are presented in FIGS. 7, 8, 10, and 11.

Figures 4A, 4B:
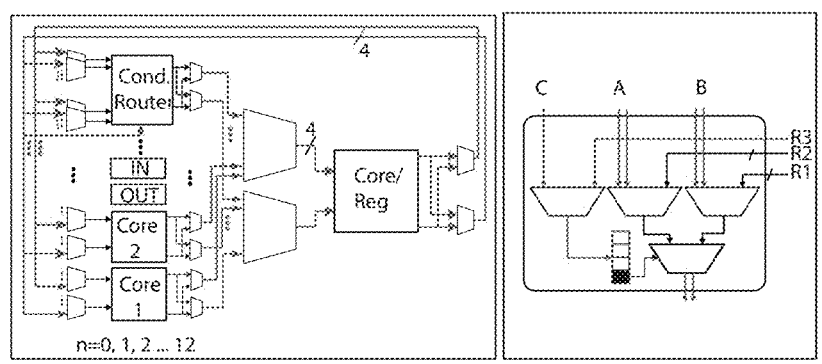
FIG. 4A is a schematic of a router and FIG. 4B is a schematic of a router.

A PIM cluster contains a plurality of processing cores, an internal buffer, and a router to interconnect all the components. The router is connected to each processing core and is configured to communicate data among each processing core in parallel. The router, as shown in FIG. 4A, contains an n-channel crossbar switch with 8-bit width, where (n−1) is the number of processing cores in each PIM Cluster. Each 8-bit channel contains a pair of 4-bit sub-channels to provide finer granularity to each communication. The crossbar switch is implemented using a set of pass-transistor-based multiplexers. The implementation of a specific decomposition is made possible by the router of the PIM cluster that enables the data segments to travel among the processing cores within the PIM cluster in each step of execution. A conditional router is shown in FIG. 4B.

The PIM cluster reads data from an adjacent DRAM subarray, processes the data, and writes the processed data back to the DRAM subarray. This process is assisted by the internal buffer of the PIM cluster that contains a block of data at a time. During memory reads, a row of data stored in the DRAM subarray is latched by the sense amplifiers of the subarray. The buffer of the PIM cluster reads data from one out of a plurality of subsets of the sense amplifiers of the DRAM subarray via a multiplexer switch. The router is able to read individual data from the buffer and distribute it to the processing cores in order to perform computations. The outputs of the computations are written back to the buffer. The buffer then writes the data back to the DRAM subarray via a de-multiplexer switch to one out of a plurality of subsets of the sense amplifiers of the DRAM subarray. These sense amplifiers write the data back in the subarray. Since the PIM cluster is located within DRAM, a negligible delay (i.e., a few nanoseconds) is caused by the reading/writing of the data to/from the cluster. In comparison, a CPU would require several milliseconds of delay to read/write data to/from the DRAM.

Figure 2:
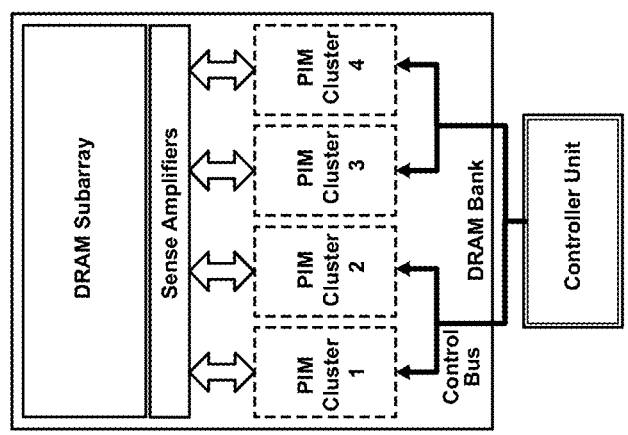
FIG. 2 is a schematic of an embodiment of a single controller unit in communication with the routers in multiple PIM clusters.

The router and the processing cores in the PIM cluster are controlled by a controller unit that operates under instructions issued by the user application. The controller unit contains executable program of operation decomposition algorithms. The controller unit can be operated be a user. The controller unit uses a different algorithm for executing each different operation. It is these algorithms that makes it possible to execute various operations on the same hardware, i.e., the PIM cluster. The term user refers to the actual programmer personnel who will be writing the programming codes to operate the device. Therefore, with the aid of the controller unit, concurrent operations are coordinated in the processing cores, and the routing of the data segments among the processing cores is accomplished via the router to orchestrate the intended operations. The controller can be connected to the routers of multiple PIM clusters via a shared control bus as shown in FIG. 2. The PIM clusters connected to the same controller via the control bus perform identical operations under a Single Instruction Multiple Data (SIMD) layout.

The controller unit enables the processing cores in a PIM cluster to be programmed dynamically during runtime. This is performed by rewriting the function-words of the processing cores' LUTs. This can be done by the user. The user can send instruction signals to the controller unit to reprogram each programming core of a pPIM cluster. In the prior works, the circuit overhead increased proportionally with the number of different operations that are supported by the device. However, in this invention, the same PIM cluster can execute as many different logic/arithmetic operations as possible via dynamic reprogramming. Therefore, the hardware overhead does not scale up in proportion to the number of different functionalities. Moreover, it is possible to design and implement newer operations on the same hardware (i.e., PIM cluster) without any modification to the hardware.

Figure 5:
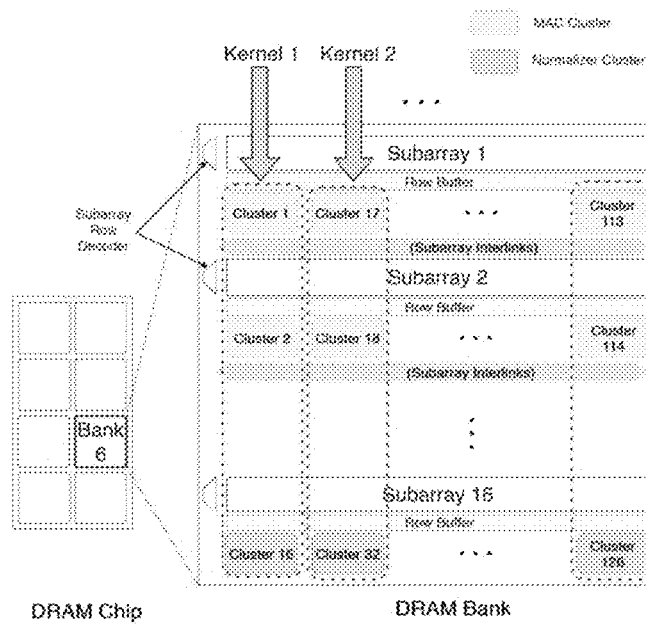
FIG. 5 is a schematic of a pPIM cluster organization inside a DRAM chip programmed for MAC operation.

The PIM clusters are arranged strategically within the DRAM banks in order to access data from the DRAM cells with high bandwidth and minimal latency. A plurality of PIM clusters is arranged in a 2-D distribution inside DRAM banks. FIG. 5 demonstrates the arrangement of PIM clusters in a DRAM bank. Inside the DRAM bank, the PIM clusters are arranged in rows in-between the DRAM subarrays such that each row of PIM cluster has one subarray above and one subarray below it. Each such row contains a plurality of PIM clusters (i.e., four). These PIM clusters have shared access to the subarray to the neighboring DRAM subarrays.

For operating on complex applications (i.e., Neural Network processing), multiple PIM clusters inside a DRAM bank perform high-bandwidth communications. Since conventional memory chip architecture is primarily designed to offer maximum communication bandwidth through its (input/output) I/O, its internal communication bandwidth is comparatively poor. Therefore, this invention utilizes an in-memory communication infrastructure that leverages subarray bitlines for high-bandwidth communications among the PIM clusters.

A plurality of PIM clusters in a DRAM bank act massively parallel processors and share the workload of a specific task/application. For example, a particular task/ kernel (i.e., a Deep Neural Network Layer) is shared among a group of PIM clusters inside a DRAM bank such that these PIM clusters can also exchange/share data during processing. As a result, a particular task is processed in parallel across these PIM clusters, resulting in reduced processing latency.

The invention is suitable for accelerating data-parallel applications such as Deep Neural Network acceleration, Data Encryption, Graph Processing, Automata Processing, Image Processing, Genomic Sequencing.

A primary application of the invention is Deep Neural Network acceleration. It can perform Deep Neural Network inference with 8-bit fixed-point precision and 12-bit floating point precision, 8-bit/16-bit binary weighted precision and 4-bit fixed-point precision of the data.

The invention can perform massively parallel data encryption using AES and other encryption algorithms. It supports AES encryption with 128-bit, 192-bit and 256-bit key, along with in-memory Key Expansion functionality. This makes it suitable for the adoption of in-memory built-in security of the data-center architectures.

Due to low-power parallel processing capability, the invention is suitable for real-time computer vision applications in mobile and edge devices such as autonomous driving module, drones and industrial robots.

The disclosure will be further illustrated with reference to the following specific examples. It is understood that these examples are given by way of illustration and are not meant to limit the disclosure or the claims to follow.

EXAMPLES

Figure 3:
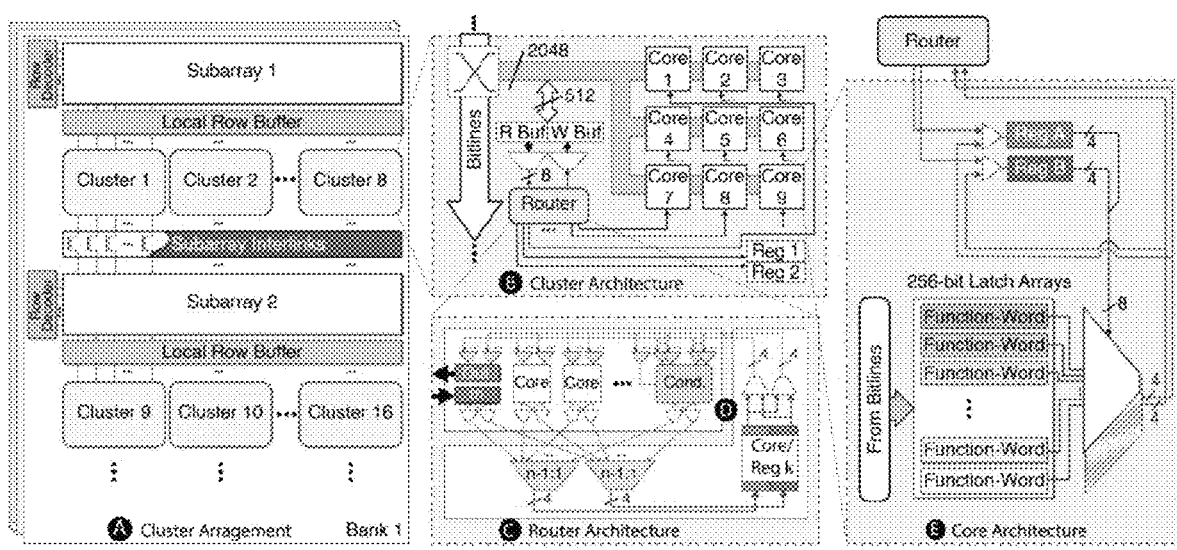
FIG. 3 is a hierarchical view of a pPIM architecture.

FIG. 3 shows and embodiment of a hierarchical architecture of a pPIM inside a DRAM chip including the overall arrangement of the clusters inside a DRAM bank (❶), a cluster architecture (❷) and a cluster router architecture (❸) and the architecture of a core in a cluster (❹).

Example 1: Fixed Point 8-Bit Accelerator

The PIM cluster can be programmed to implement different layers of CNNs & DNNs, especially the Convolutional Layers which involves a large number of consecutive multiplication & accumulation (MAC) operations. The baseline design performs MAC on 8-bit operands since it represents the majority of image & video pixel data. In this operational mode, both the inputs and the weights have 8-bit fixed point precision.

Since each processing core is capable of multiplication between a pair of 4-bit operands, the 8-bit inputs and weights are first disintegrated into 4-bit operands. These are then multiplied, followed by a series of 4-bit addition operations in several stages. The partial products of the four-bit segments are identified with Vx (x=0, 1, 2, 3), as shown below.

$$V0 = a_L b_L \tag{1}$$

$$V1 = a_L b_H \tag{2}$$

$$V2 = a_H b_L \tag{3}$$

$$V3 = a_H b_H \tag{4}$$

Subscripts 'H' and 'L' refer to the upper and lower 4-bit segments, respectively.

Figure 6:
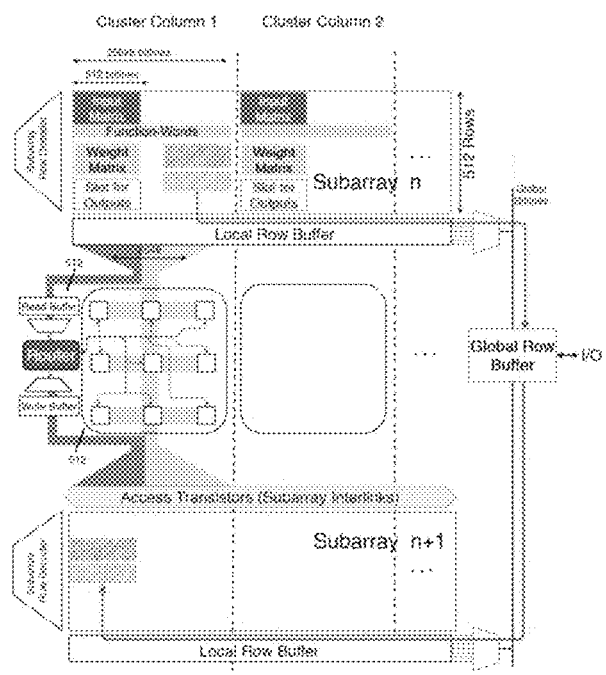
FIG. 6 is a schematic of a data articulation between a subarray and cluster ports.
Figure 7A:
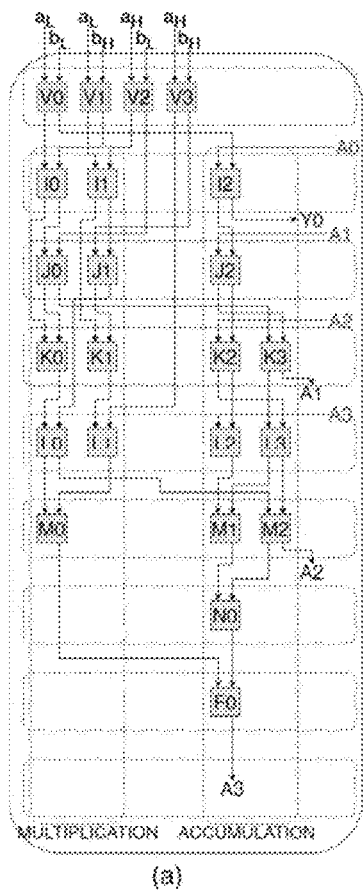
FIG. 7A is a schematic of a data flow model and FIG. 7B shows a mapping of the data-flow model for 8-bit fixed point MAC operation in a pPIM cluster.
Figure 7B:
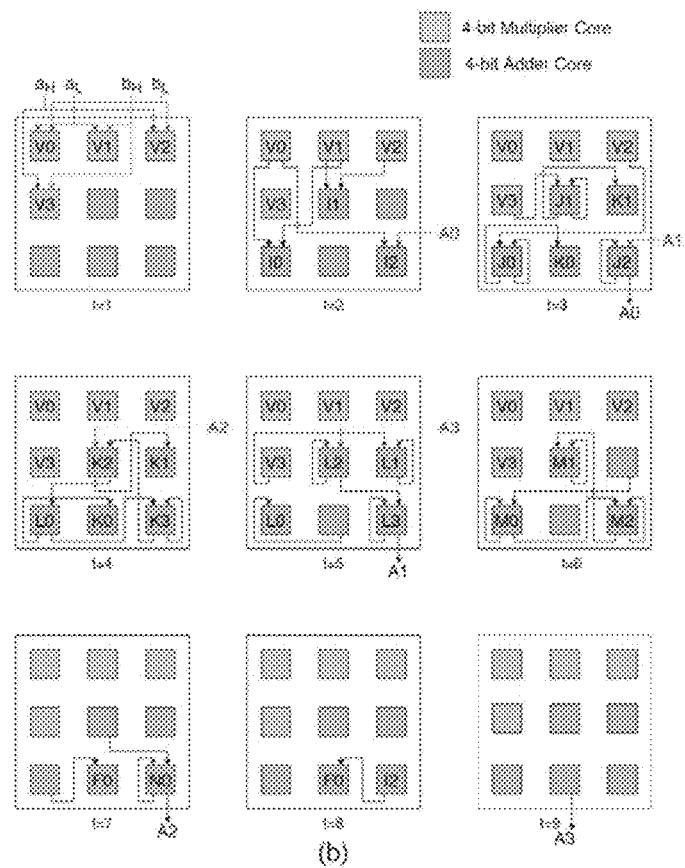

These partial products from (1)-(4) are aggregated through a stepwise accumulation algorithm to generate the final product. This accumulation scheme is presented in FIG. 7A which shows the data-flow model that implements this algorithm in a PIM cluster and FIG. 7B which shows the mapping of each process step in the data-flow model to the processing cores within the PIM cluster. The blue and red squares represent processing cores programmed to perform 4-bit multiplication and 4-bit addition operations respectively. Each process in the data-flow model has been given a unique tag including a letter and a number for the convenience of implementation and verification, as can be seen in FIG. 6. Letters I, J, K, L, M, N & F represent the clock-steps of addition operations respectively, while numbers 0, 1, 2, 3 represent different parallel operations taking place during each step.

It is possible to execute the ReLU activation function inside one processing core in a PIM cluster programmed to generate an output value of 0 for all the 8-bit inputs with negative sign-bit while producing identical output for all positive inputs.

Pooling operations can be implemented with a chain of comparison operation. The processing cores can be programmed to act as 4-bit comparators. The 8-bit comparator is realized with one comparator core and two additional cores implementing custom logic functionalities shown in Table 1:

TABLE 1(a)

Comparator Truth Table

| Comparator | Out H | OutL |
|---|---|---|
| Register A > Register B | Max (A, B) | 1100 |
| Register A < Register B | Max (A, B) | 0011 |
| Register A = Register B | A/B | 1111 |

TABLE 1(b)

Logic Core 1 & 2 Truth Table

| Logic Core 1 | |
|---|---|
| Register B | OutH |
| 100 or 1111 | Register A |
| 0011 | 0000 |
| Logic Core 2 | |
| Register B | OutH |
| 0011 or 1111 | Register A |
| 1100 | 0000 |

Figure 8:
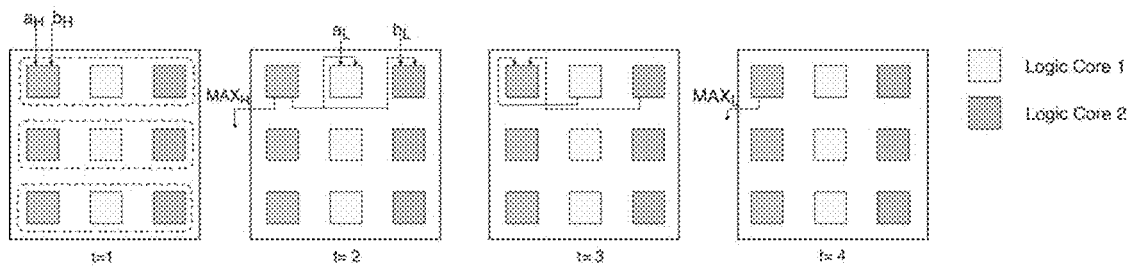
FIG. 8 is a schematic of an implementation of 3 parallel (each per row) 8-bit comparators in one pPIM cluster.

Based on these programming schemes of the processing cores, the 8-bit fixed point comparison is executed in 4 steps inside a PIM cluster, which is shown in FIG. 8. Three parallel 8-bit comparisons can take place concurrently. Each max-pool filter can be realized by formulating a chain of such comparisons.

Example 2: 12-Bit Floating Point Accelerator

The invention is capable of performing MAC operation on a pair of 12-bit Floating Point numbers. The 12-bit Floating point format consists of 7-bit unsigned mantissa, 1-bit sign and 4-bit exponent with bias. The algorithm for the MAC operation is presented in FIG. 9A. The adopted algorithm combines the floating point multiplication and accumulation (addition) together into a single operation. In order to perform multiplication, the mantissas are multiplied and the exponents are added. In the case of an overflow, the product is normalized. Since a series of MAC operations are to be performed for our application, normalization is avoided in the case of an underflow.

For the accumulation, the exponents of the addends are to be equated. This is performed by identifying the smaller exponent of the two addends and then right shifting the mantissa of smaller addend. The accumulation is performed in 8-bit 2's complemented form of the mantissas and the output is left in the 2's complemented form for the convenience of further cycles of MAC operations.

A whole MAC operation is performed inside a single PIM cluster. For this purpose, the processing cores in a PIM cluster are programmed with specific functionalities which are discussed below and shown in FIG. 9B.

Multiplier (Processing Core 2): In this processing core, a pair of 4-bit inputs produce an 8-bit product.

Adder (Processing Cores 4, 5): These processing cores perform addition on a pair of 4-bit inputs. The output is considered 8-bit with a sign-extended 4-bit carryout.

Adder/Multiplier Combined (Processing Core 1): The functionality of this processing core is split between addition and multiplication for the purpose of maximum resource utilization. The MSB 4-bits of the output represent the upper 4-bits of the product of the input pair while the LSB 4-bits represent the sum of the input pair. This processing core is used only for a specific case where the sum does not generate a carry-out (addition of exponents).

Incrementer/Decrementer (Processing Core 3): It increments the input in the register B if register A contains 1xxx. Conversely, it decrements the content in register B only when register A contains 0001.

2's Complement Generator (Processing Core 6): The input to this processing core is an unsigned 7-bit number, accompanied by a sign-bit to the MSB position, making it a complete 8-bit input. This input is split across two registers A & B. It converts the input into its 8-bit 2's complement form.

Comparator/Differentiator (Processing Core 7): The lower 4-bits of the output generates the absolute difference between the inputs while the upper 4-bits act as a comparator. The comparator is programmed to report a 'don't care' state for Equal condition (i.e., A>B Ó4'b0001, A<B Ó4'b0000, A=B Ó 4'b000x).

Split Right-shifters (Processing Cores 8, 9): The right-shift operation is split across two processing cores. They receive the upper and lower 4-bits of the 8-bit operand in their register A's respectively. The register B of both processing cores receive the shift position value. Each processing core produces an 8-bit output in which the 4-bit input is placed in its respective right-shifted position.

The table below demonstrates the operation of the split right-shifters.

| (a) Input Number: 11011100; Shift Position: 3(0011) | | | | |
|---|---|---|---|---|
| | Purple Core | | Maroon Core | |
| Registers | A | B | A | B |
| Input | 1101 | 0011 | 1100 | 0011 |
| Output | 0011010 | | 00000001 | |

Final Shifted Output: 00011010+00000001=00011011

Adding these outputs together in two adder cores produces the final shifted value. The split shifter core pair followed by a pair of adder cores make a complete shifter block. In the case of negative inputs (identified by a '1' in the MSB), first shifter core inserts 1s to the left of the input number instead of zero to realize the negative sign extension. The 2nd shifter core's operation is indifferent to whether the input is a positive number or a negative number.

Figure 9A:
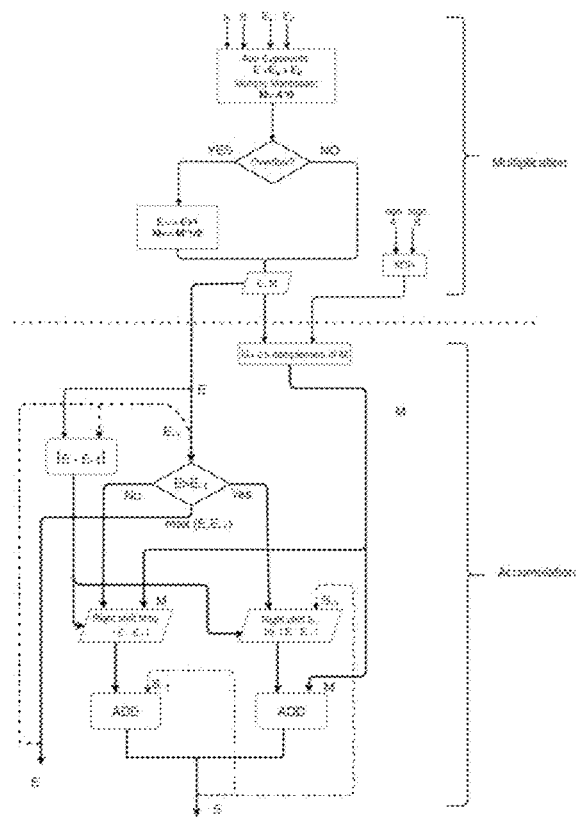
FIG. 9A is a schematic of a 12-bit floating point MAC algorithm and FIG. 9B shows a core mapping in a cluster to perform a 12-bit floating point MAC operation.
Figure 9B:
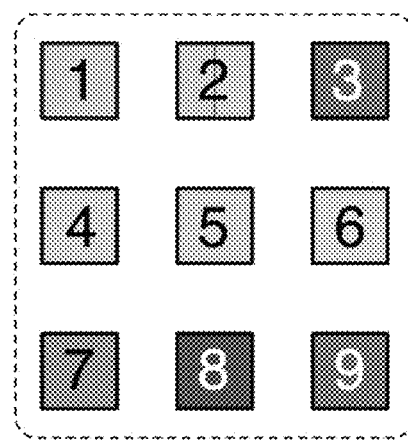
Figure 10A:
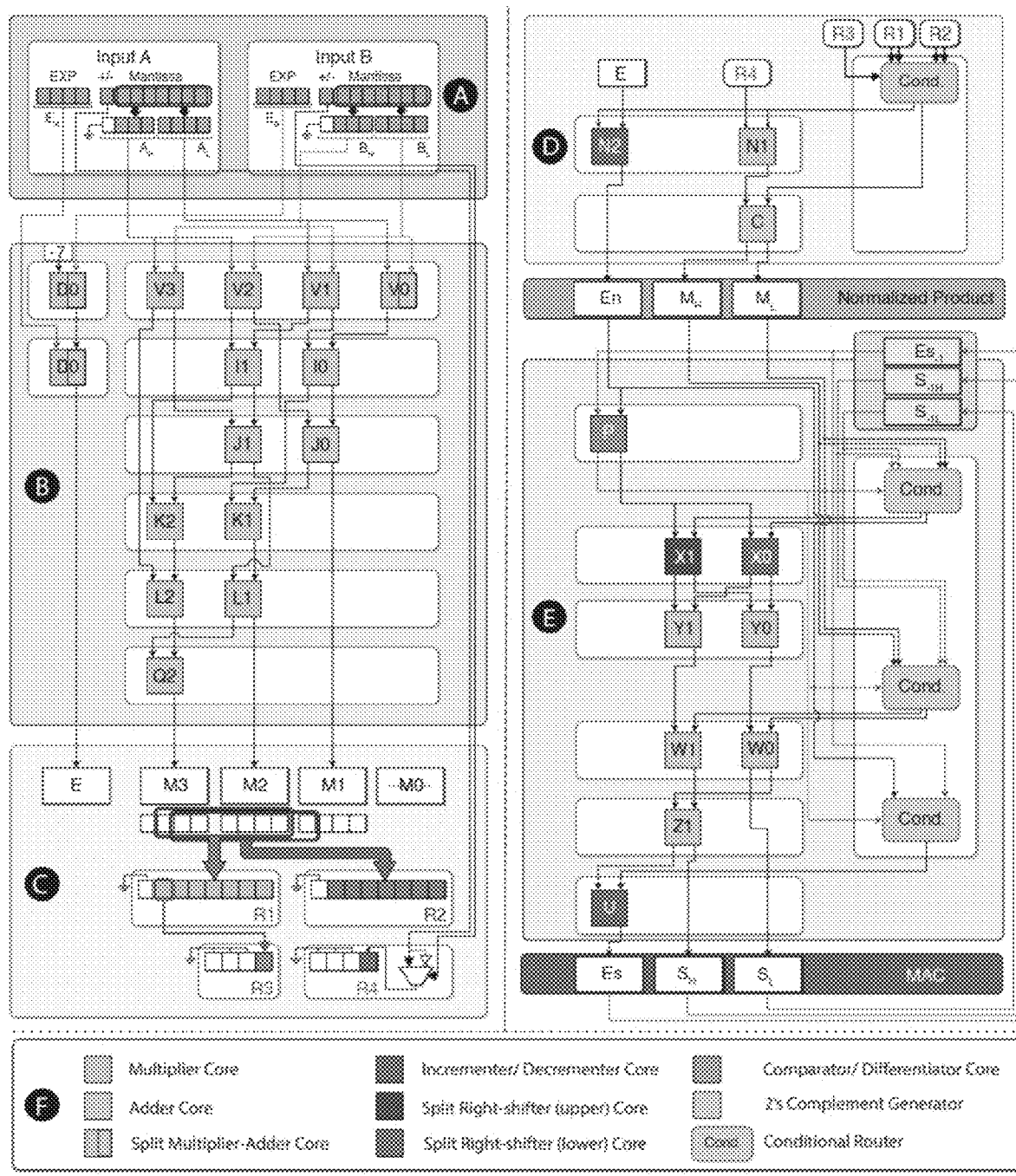
FIG. 10A shows a data-flow model for executing a 12-bit floating point MAC operation in a pPIM cluster and FIG. 10B shows a step wise operation mapping for executing a 12-bit floating point MAC operation in a pPIM cluster.

Based on the processing core programming scheme in the previous section as well as the algorithm presented in FIG. 9A and the core programming in FIG. 9B, a data-flow model for implementing the 12-bit floating point MAC algorithm has been which is presented in FIG. 10A. The corresponding step wise mapping of this algorithm onto a PIM cluster is presented in FIG. 10B.

First, the unsigned portion of the mantissas of FIG. 10A are multiplied, the exponents are added, as shown in the segment ❶. The 7-bit unsigned mantissas of the two floating point numbers, A & B are split into two 4-bit sections each called AH, AL & BH, BL, respectively (AH and BH are zero-padded to make them 4-bit, shown in the segment ❶ of the FIG. 10A). Partial products V0-3 are generated from cross multiplication of these 4-bit operands, similar to how it was performed for the 8-bit fixed point MAC operation, shown in equations (1)-(4). These partial products then undergo a series of partial addition in five consecutive time-steps to generate the 14-bit product in four 4-bit segments: M3, M2, M1 & M0, as can be seen in FIG. 10A. The M0 segment is entirely discarded. Concurrently, the exponents of the two operands are also added and adjusted for the bias by subtracting −7.

In the segment ❷ of FIG. 10A, the custom router wirings are presented. These custom routes are primarily utilized for normalization of the product (R1, R2 & R3) and determining the sign of the product (R4). R1 reads bit positions 7th-13th, R2 reads bit positions of 6th-12th and R3 simply reads the 13th bit of the product mantissa. In the segment ❸ of FIG. 10A, these routes forward their signal into the router, which detects an overflow. In the case of an overflow, the mantissa and the exponents are simultaneously normalized in parallel steps of 'N1' and 'N2'. The custom route R4 determines the sign of the product with the aid of a single bit XOR get embedded in it.

This sign is zero-padded and then appended to the normalized mantissa before it is converted into its 2's complement form in the step 'C' of segment ❸ in FIG. 10A.

The normalized product of the mantissas of the inputs is then accumulated to the sum-of-products from the previous cycle of operation (mantissa S(−1) & exponent E(−1)) in the segment ❹ of FIG. 10A. The router is fed both the 2's complemented mantissa of the product and the mantissa of the prior sum-of-products S(−1). Based on the comparison of the exponents of the product (E) and that of the prior sum-of-product (E(−1)) in the step 'P', the router forwards either of these (the smaller one) to the right-shifter block. The comparator core, via its upper 4-bit output, also informs right-shifter block how many positions of shifting is required.

The right-shifter block consists of the two split-shifter cores. Each of these shifters expand the 4-bit split input to 8-bit data with its shifted position. Then the 8-bit shifted outputs of the both split shifters are added in the next step to form the complete 8-bit shifted output. After the right-shifting is performed, the shifted mantissa is added to the other mantissa to generate the accumulated mantissa (S). If there's an overflow, the exponent (E) is decremented in the step 'U'.

Figure 10B:
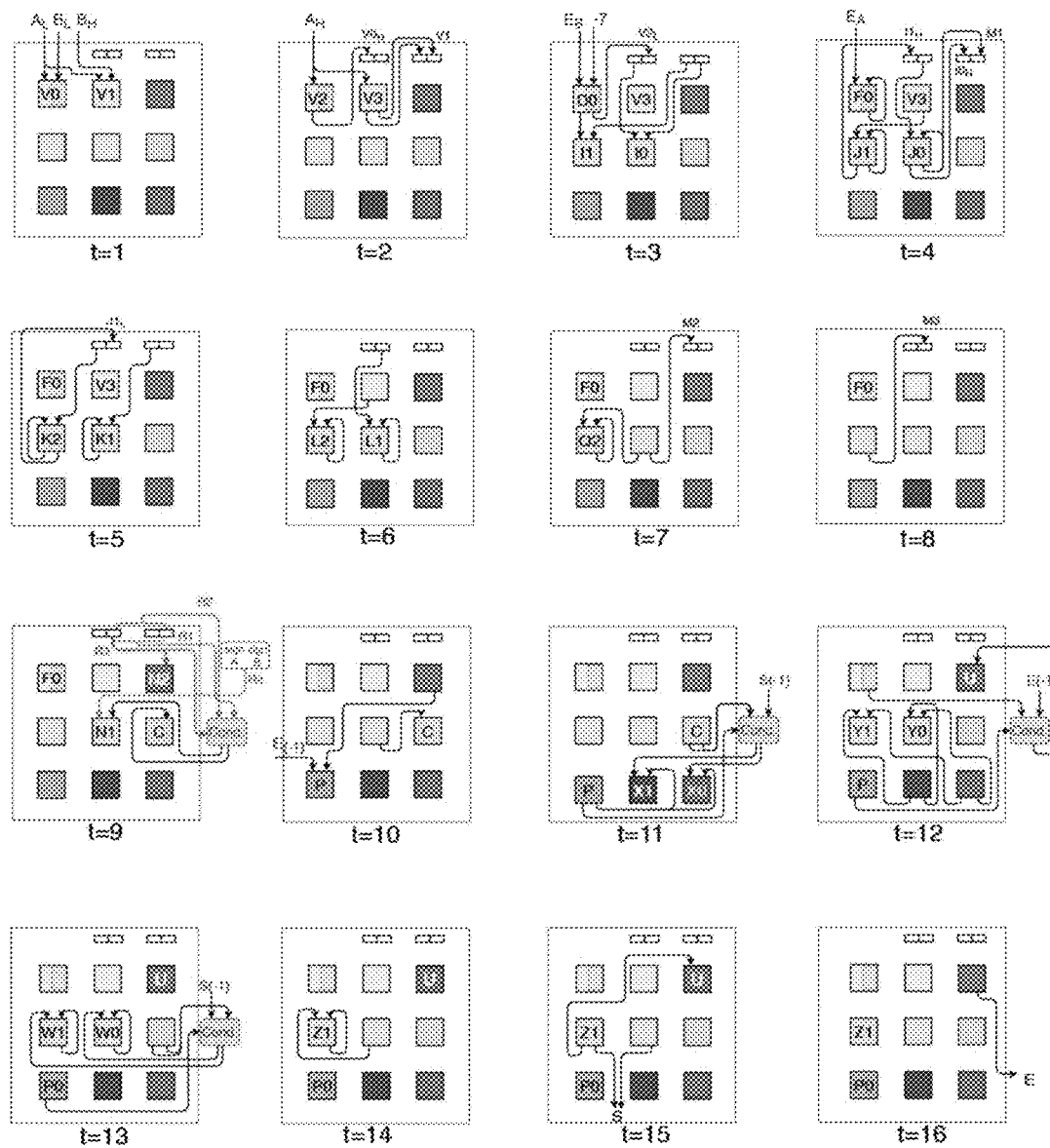

The whole operation requires 16 time-steps to perform as can be seen from FIG. 10B. The last time-step can be overlapped with the beginning of the next cycle of operation, which reduces the effective length of the operation to 15 time-steps or clock cycles.

Figure 11A:
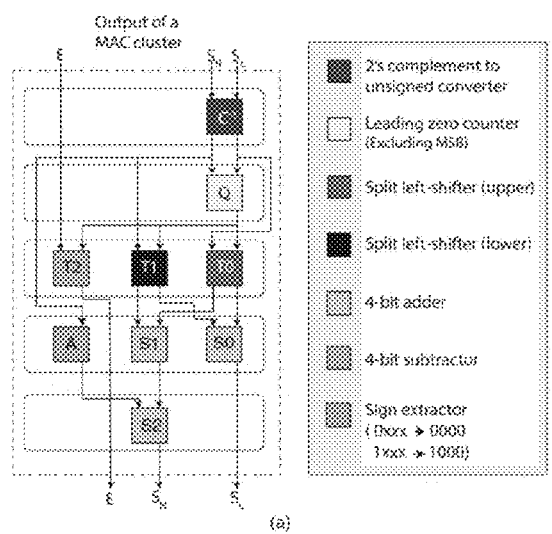
FIG. 11A shows a programming scheme for the cores in a normalizing cluster and FIG. 11B shows a programming scheme for the cores in a pooling cluster.

The output of MAC operation remains in its 2's complement form and not normalized. This is because, each PIM cluster perform a series of consecutive MAC operations during a matrix multiplication and during each operation the mantissa of the previous MAC is required in the 2's complemented form. The mantissa of the final output, however, can be converted back to unsigned form in a different PIM cluster which is programmed to specifically implement the normalizing functionality. FIG. 11A shows a 'Normalizing Cluster' which has been programmed to normalize the output of the final MAC output. It receives both the mantissa (in the 2's complement form) and the exponent of the final output of a MAC cluster and converts it to the unsigned format and then normalizes it. Such a cluster is dedicated to only this task and normalizes the output of multiple other PIM clusters. One cluster in a column of cluster inside a DRAM bank is programmed as the normalizer cluster, as shown previously in FIG. 5.

In this cluster, the 2's complemented mantissa of the output of a MAC cluster is first converted to its 7-bit unsigned form. Then the unsigned mantissa is left-shifted in a left-shifter block. The number of bit-positions by which the left-shift is to be performed as well as the value by which the exponent is to be decremented to perform the normalization is determined by counting leading zeros in the unsigned mantissa. Finally, the sign-bit extracted beforehand is appended to the normalized mantissa to produce the output of the Normalizer Cluster.

Figure 11B:
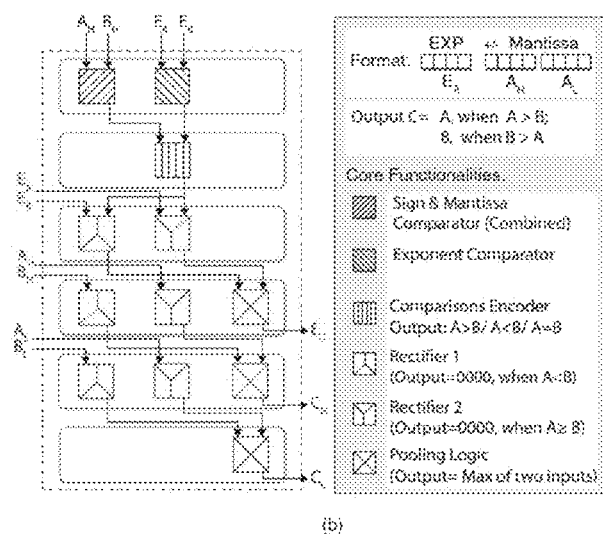

A pooling layer of a CNN can be implemented with a 'Pooling Cluster' capable of performing floating point pooling operations. FIG. 11B shows the data-flow model for the pooling operation between a pair of 12-bit floating point input numbers. First, the exponents and the upper halves of the mantissas of the two input numbers (including the signs) are compared separately across two different 4-bit comparator cores in parallel.

The results of these comparisons are combined together into one unique comparison by a specialized comparison encoder' core. The output of this core works as the decisive factor for the pooling operation that follows.

The ReLU activation function can be implemented using two cores inside a PIM cluster. The ReLU unit, based on the sign of a number, either forwards it or generates a zero value. Therefore, this operation is analogous to performing logical AND with the sign-bit. It is implemented with a ReLU unit inside a Pooling Cluster since the pooling operation occupies only seven cores in a cluster.

Example 3: Downscaled Precision Operational Modes

These operation modes include 4-bit fixed point precision, 8-bit & 16-bit binary weighted precision and 8-bit ternary weighted precision operation modes which offer higher performance throughput and lower energy consumption at the cost of accuracy in applications.

Figure 12A:
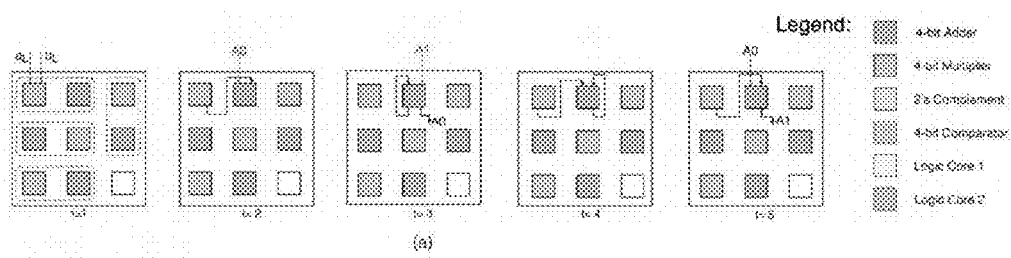
FIG. 12A shows a 4-bit fixed point MAC.

4-bit Fixed Point Precision: Both the inputs and the weights have 4-bit fixed point precision. Since each processing core is capable of performing 4-bit multiplication, no operand decomposition is required in this case. The 8-bit product of the multiplication is, however, decomposed into 4-bit segments and accumulated in four steps in an adder core, resulting in a total of five operational steps. The data-flow mapping is shown in FIG. 12A. Four such 4-bit fixed point MAC operations can run in parallel in a cluster.

Figure 12B:
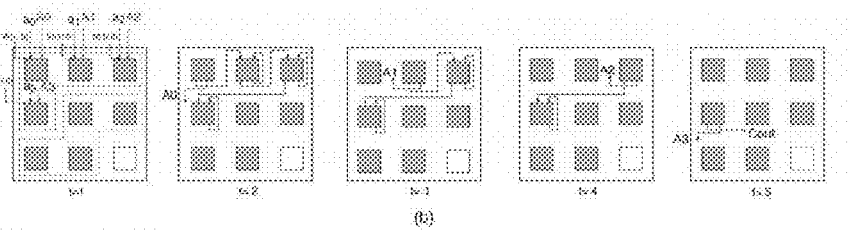
FIG. 12B shows a 16-bit fixed point binary weighted.
Figure 12C:
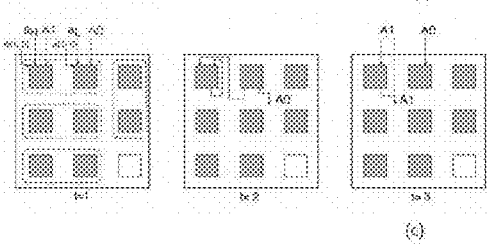
FIG. 12C shows an 8-bit fixed point binary weighted.

16-bit & 8-bit Binary Weighted Precision: In these modes, the inputs have 8-bit or 16-bit precision while the weights are binary. The MAC operations are reduced to bitwise AND operation between the input and weights, followed by a sequence of addition operations. The weights act as the Synchronous Reset signal of the input register A of the cores to implement the bitwise AND, as shown in FIG. 12B and FIG. 12C.

Figure 12D:
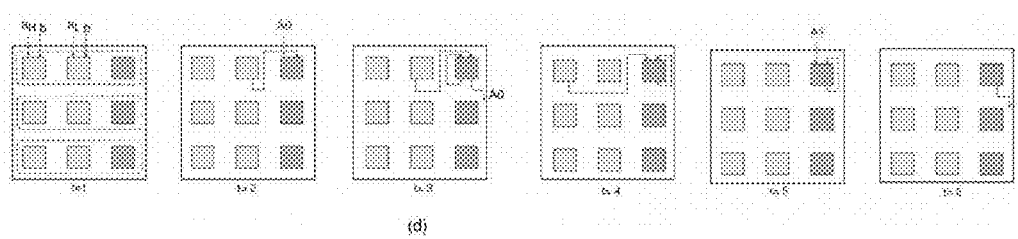
FIG. 12D shows an 8-bit signed ternary weighted downscaled precision MAC operations in a pPIM cluster.

Signed 8-bit Ternary Weighted Precision: The weights are two bits long and can have three possible values: +1, 0 and −1 while the inputs are 8-bit signed values. The inputs are converted to their 2's complement format in 4-bit segments and also multiplied by the weights at the same time. Then these products are accumulated in three consecutive steps. The data-flow mapping is shown in FIG. 12D.

Example 4: AES Encryption Operation

Figure 13A:
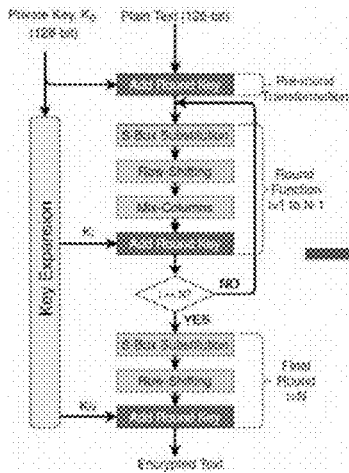
FIG. 13A shows a standard AES algorithm and FIG. 13B shows a modified AES algorithm for implementation in a pPIM.

The advanced encryption standard algorithm (AES) can be implemented in the pPIM architecture. In AES algorithm, a standard 16 bytes (128-bit) input block, called plaintext, is processed through several cycles of the 'Round Function', which is a combination of four individual processes: S-box substitution, Row-shifting, Mix-column and Adding Round Keys. FIG. 13A shows the default flowchart for AES algorithm. AES has an associate set of 'Keys' which can have different lengths such as 128-bit, 192-bit and 256-bit. Depending on the size of the key, the number of iterations of Round Function varies among 10, 12 and 14 respectively. For this work, we will only be demonstrating AES with 128-bit key with 10 rounds of the Round Function.

Figure 13B:
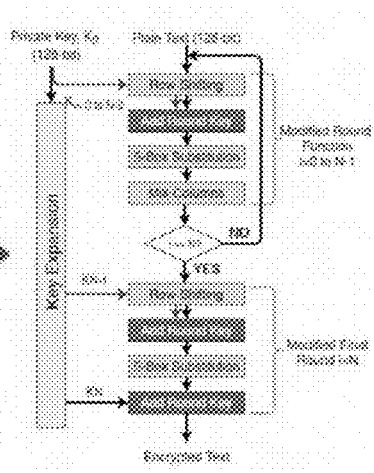

The implementation of AES brings minor change to the execution of the Round function: the shift-row operation is performed ahead of the key-addition and the sub-byte operations. FIG. 13B shows the modified execution model for the algorithm. In order to make up for this rearrangement, the shift-row operation is performed both on the plaintext (input) data-block as well as the key data-block. This rearrangement makes the execution of the algorithm on pPIM more convenient, and it is possible since none of these rearranged operations have a granularity higher than a byte.

Both the plaintext block (128-bit) and the private key block (128-bit) are arranged in the same row of a DRAM subarray to form a single batch of data-words. The plaintext block and key block bytes are read column-wise from their 4×4 block arrangements while being transformed into a single row. Prior to execution, the whole row containing both the plaintext and the key block are read into the read buffer of a PIM cluster.

Each PIM cluster executes one iteration of the round function on one column of the plaintext block at a time. The output of this column is held in the write-buffer and the next column of plaintext (and corresponding keys) are read into the cluster. Once a complete block has undergone that particular iteration of the Round function, the content of the write buffer is written back to the memory. After that, the next iteration of the Round function commences.

Figure 14:
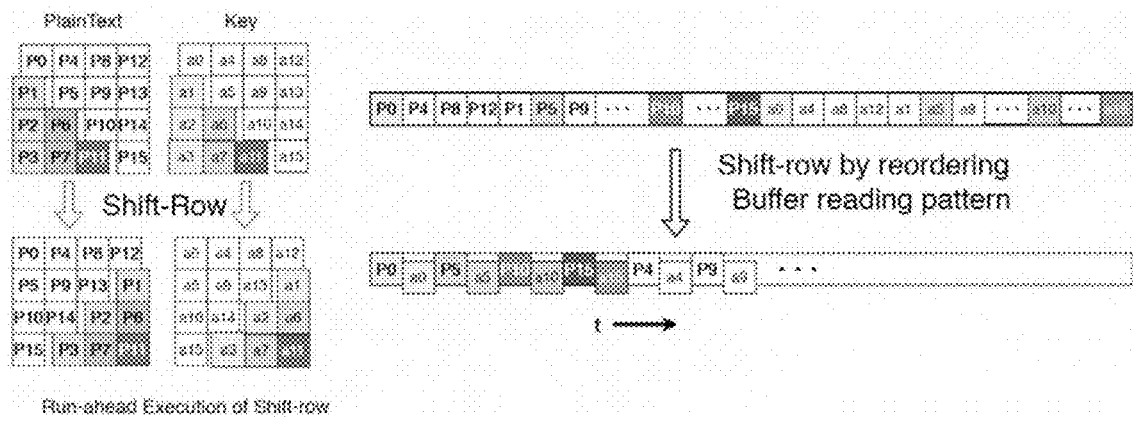
FIG. 14 shows a modified shift-row operation via re-ordering of operand reads from the cluster read-buffer.

Implementation of Shift-row: This operation involves circular shifting of the rows in a plaintext block where nth row is circularly shifted by n positions. The router sequentially reads a pair of operands from the buffer at a time into the cluster. By cleverly manipulating the temporal order of reading the operands into the cores of a cluster, it is possible to perform the shift-row operation, in a similar manner to the sorting algorithms. This is the reason that we decided to bring the shift-row operation ahead of key addition and sub-byte. FIG. 14 shows the modified shift-row operation by manipulating the order of operand reading by the router in the read-buffer. In the default Round function, the plaintext and the key bytes would be combined into single bytes through the key-addition operation before they reach the shift-row stage. Since this is not the case here, both the plaintext bytes and as well as the key bytes have to undergo the shift-row separately in the rearranged order of execution.

Figure 15A:
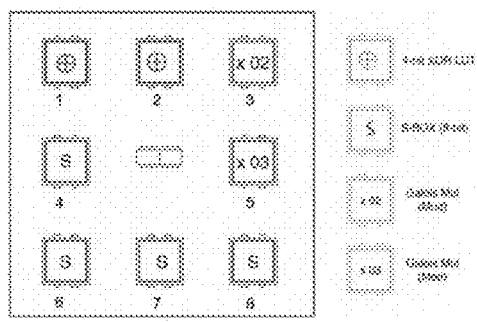
FIG. 15A shows a core programming for executing a round function and FIG. 15B shows byte-splitting for bit-wise XOR operations.

In-cluster Operations: The cores in a PIM cluster are programmed to execute rest of the Round function. FIG. 15A shows the core programming scheme.

Figure 15B:
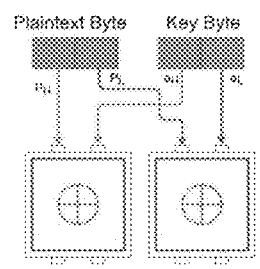

Key Addition: The key addition operation involves bitwise XOR between each bit of the plaintext and the key. Since each PIM core can perform logic operation between a pair of 4-bit operands, two cores are programmed to perform bitwise XOR. A plaintext byte and a key byte both are split into 4-bit segments to be distributed to those two cores, as shown in FIG. 15B.

Sub-byte: The sub-byte operation involves a byte-wise substitution of the operands based on a substitution table. This table can be implemented within single a core by splitting each input byte across registers A & B of a core. Four cores in a cluster are programmed to perform sub-byte and are identified as S0, S1, S2 & S3 in FIG. 15A and FIG. 16.

Mix-column: The mix-column operation requires one whole column of a data block. This is why each cluster reads one column of the plaintext block at a time in the first place.

This operation involves Galois field multiplications, followed by one stage of bitwise addition (XOR). Two cores in a cluster are programmed to perform Galois field multiplication by 2 and 3 respectively. The bitwise addition is taken care of by the bit-wise XOR cores.

Figure 16:
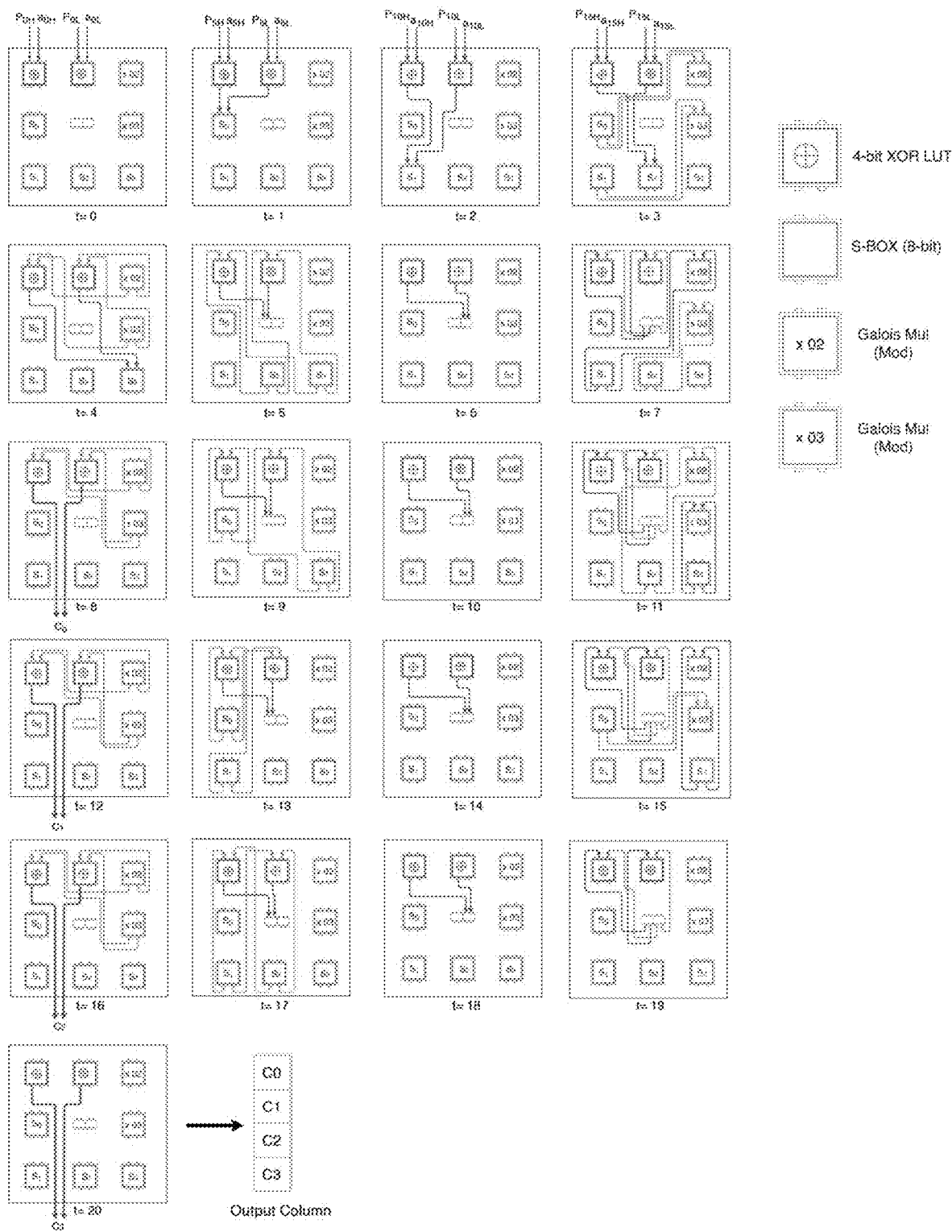
FIG. 16 shows a stepwise execution of one iteration of the modified round functions on one column of data-bytes.

The pattern of Galois field multiplication also rotates in each iteration of the Round function. This rotating pattern is also addressed while reading the operands from the read-buffer by re-ordering the pattern of reading, just as for the shift-row operation. FIG. 16 shows the stepwise mapping of the operation in a PIM cluster, including the mix-column operation. One iteration of the Round function on one column of plaintext block is performed in 20 clock cycles.

Figure 17:
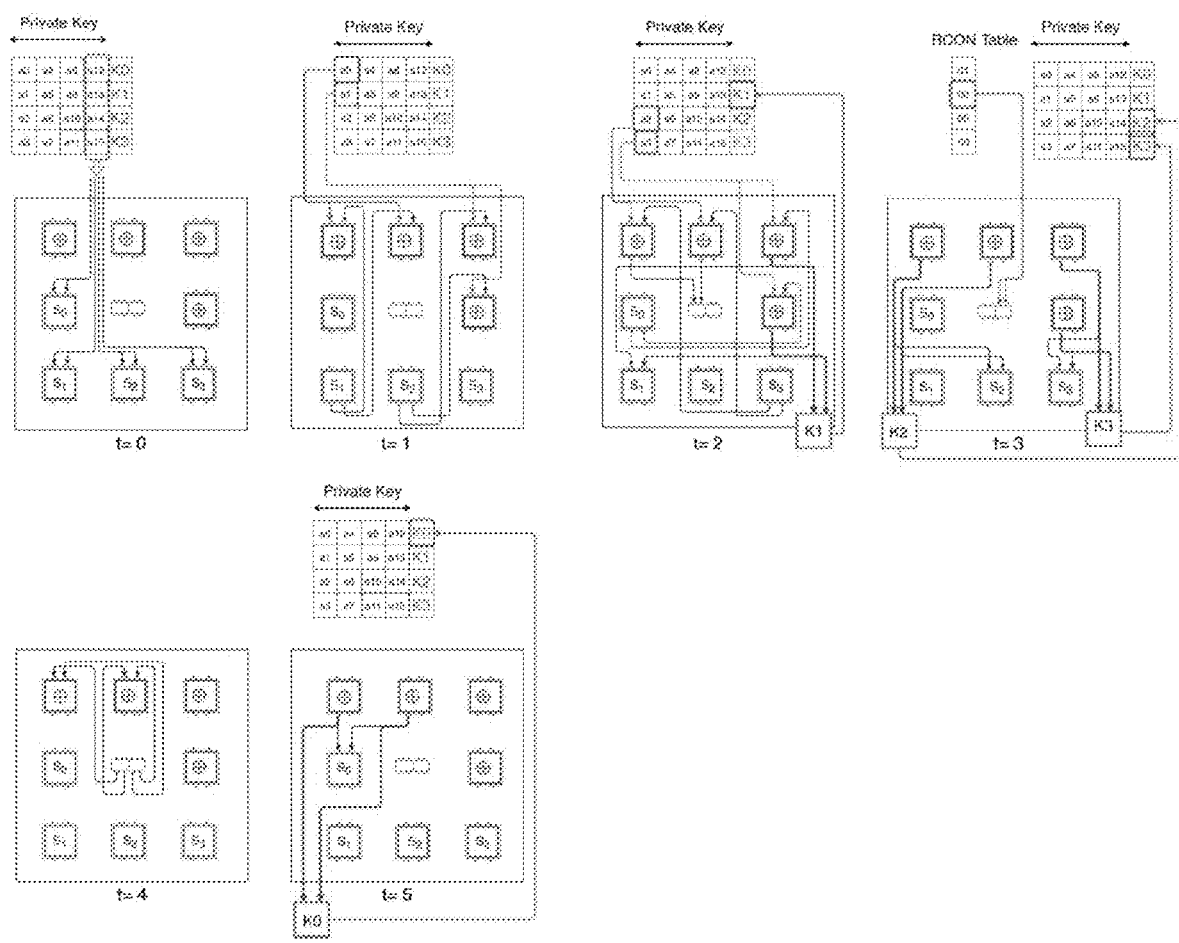
FIG. 17 shows a stepwise execution of the key expansion to generate one column of a secondary key.

Key Expansion: Key expansion is required for the consecutive iterations of the Round function after the first one. The key expansion is performed before initiating the execution of the Round function. As shown previously in FIG. 5, one cluster in each column of clusters in a DRAM bank is programmed to perform key expansion. Inside a key expansion cluster, four processing cores are programmed to perform bitwise XOR and the rest are programmed as S-boxes. FIG. 17 shows the step wise execution of the key expansion algorithm inside the cluster. Having generated the secondary keys, these keys are then distributed to all other clusters in the cluster column, where the Round Functions will be executed next.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed is:

1. A processor-in-memory, comprising:
 a PIM cluster configured to read data from and write data to an adjacent DRAM subarray, wherein the PIM cluster comprises a plurality of processing cores, each processing core of the plurality of processing cores containing a look-up table, and a router connected to each processing core, wherein the router is configured to communicate data among each processing core; and a controller unit configured to communicate with the router, wherein the controller unit contains an executable program of operational decomposition algorithms.

2. The processor-in-memory of claim 1, wherein the look-up table is programmable with respect to logic or arithmetic operation.

3. The processor-in-memory of claim 1, wherein the plurality equals nine processing cores.

4. The processor-in-memory of claim 1, wherein the look-up table is an 8-bit look-up table.

5. The processor-in-memory of claim 1, further comprising a plurality of PIM clusters, each PIM cluster of the plurality of PIM clusters configured to communicate with the controller unit.

6. A DRAM chip comprising a plurality of DRAM banks, each DRAM bank comprising a plurality of interleaved DRAM subarrays and a plurality of PIM clusters according to claim 1.

7. The DRAM chip of claim 6, wherein the look-up table is programmable with respect to logic or arithmetic operation.

8. The DRAM chip of claim 6, wherein the plurality equals nine processing cores.

9. The DRAM chip of claim 6, wherein the look-up table is an 8-bit look-up table.

10. The DRAM chip of claim 6, wherein each PIM cluster of the plurality of PIM clusters is configured to communicate with a single controller unit.

* * * * *